US008839934B2

(12) United States Patent
Tellermann et al.

(10) Patent No.: US 8,839,934 B2
(45) Date of Patent: Sep. 23, 2014

(54) CLUTCH AND HYBRID DRIVE WITH CLUTCH

(75) Inventors: Uwe Tellermann, Reutlingen (DE); Kaspar Schmoll Genannt Eisenwerth, Vaihingen-Horrheim (DE)

(73) Assignee: Robert Bosch GmbH, Stuttgart (DE)

( * ) Notice: Subject to any disclaimer, the term of this patent is extended or adjusted under 35 U.S.C. 154(b) by 578 days.

(21) Appl. No.: 12/919,853

(22) PCT Filed: Feb. 25, 2009

(86) PCT No.: PCT/EP2009/052210
§ 371 (c)(1),
(2), (4) Date: Nov. 23, 2010

(87) PCT Pub. No.: WO2009/106538
PCT Pub. Date: Sep. 3, 2009

(65) Prior Publication Data
US 2011/0056791 A1    Mar. 10, 2011

(30) Foreign Application Priority Data

Feb. 29, 2008  (DE) .......................... 10 2008 000 464

(51) Int. Cl.
*F16D 13/58*  (2006.01)
*F16D 28/00*  (2006.01)

(52) U.S. Cl.
USPC .................................. 192/85.57; 192/114 R

(58) Field of Classification Search
USPC .......... 192/85.51, 85.57, 85.59, 85.6, 111.11, 192/111.12
See application file for complete search history.

(56) References Cited

U.S. PATENT DOCUMENTS 3,359,862 A  * 12/1967 Modrich .......................... 91/42
4,691,814 A  * 9/1987 Wimbush ................... 192/114 R
4,960,192 A  * 10/1990 Kurihara .................... 192/114 R
5,048,656 A  * 9/1991 Braun ......................... 192/85.57
5,678,671 A  * 10/1997 Leimbach et al. ......... 192/85.57
6,026,921 A  * 2/2000 Aoyama et al. ............ 180/65.25
6,896,112 B2 * 5/2005 Berger et al. ................ 192/52.4
7,350,634 B2 * 4/2008 Baehr et al. ................ 192/85.51
7,571,794 B2 * 8/2009 Fraser et al. ................. 192/85.6
8,074,779 B2 * 12/2011 Vollmer et al. ............ 192/85.57

FOREIGN PATENT DOCUMENTS

| DE | 38 32 182 | 3/1990 |
| DE | 43 02 846 | 8/1994 |
| DE | 10 2004 030 005 | 1/2006 |
| DE | 103 13 450 | 10/2007 |
| EP | 1 400 716 | 3/2004 |
| EP | 1 852 625 | 11/2007 |
| GB | 2 279 124 | 12/1994 |
| GB | 2279124 A * | 12/1994 |

* cited by examiner

*Primary Examiner* — Jacob S Scott
(74) *Attorney, Agent, or Firm* — Michael Best & Friedrich LLP

(57) ABSTRACT

A clutch for coupling an internal combustion engine in a torque-transmitting fashion and decoupling an internal combustion engine is disclosed. The internal combustion engine has a partial drive train that includes an electric machine. The clutch includes at least one adjustable element with which in conjunction with coupling means can be opened counter to a closing force generated by closing means. Locking means interacts with the adjustable element and has an adjustable locking element. The locking means interacting with the adjustable element in such a way that the coupling means are held open without an opening force having to be applied for this purpose by an adjustment means, or in such a way that the opening force which has to be applied by the adjustment means to hold the coupling means open is reduced.

11 Claims, 1 Drawing Sheet

CLUTCH AND HYBRID DRIVE WITH CLUTCH

This application is a National Stage Application of PCT/EP2009/052210, filed 25 Feb. 2009, which claims benefit of Serial No. 10 2008 000 464.5, filed 29 Feb. 2008 in Germany and which applications are incorporated herein by reference. To the extent appropriate, a claim of priority is made to each of the above disclosed applications.

BACKGROUND

In the case of conventional drive trains in motor vehicles, differences in engine rotational speed during driveaway and when shifting gears is compensated for by friction clutches, respectively variable speed gears. Hybrid drives expand the conventional drive train by an electric machine, which can be connected to the internal combustion engine via an additionally shiftable clutch, particularly a so-called starter clutch.

Automated, electrohydraulic clutches are frequently used as a starter clutch. A suitable operating strategy controls the additional starter clutch in a hybrid drive such that purely electrical driving and braking is possible in selected driving situations. The additional starter clutch is also used in order to restart the internal combustion engine when necessary. The starter clutch is thereby so embodied that it is closed (normally closed) in the event of a malfunction (pressureless). In this way, conventional driving is still possible in the event of malfunctions, such as a leak or a hardware defect of the actuator of the said starter clutch.

It is advantageous for the energy recovery during overrun conditions (recuperation) to decouple the drag torques of the internal combustion engine. For that reason, the starter clutch is opened and held open in this vehicle state. As a function of the operating strategy which is used, the hold-open time in the New European Driving Cycle (NEDC) can be up to 50%. The starter clutch must therefore be held open against a closing spring force for half of the operating time. Known starter clutches thereby require a power consumption of approximately 30 W to hold the starter clutch open. 30 W must therefore be constantly applied during 50% of the operating time in order to hold said starter clutch open. An additional, not inconsiderable fuel consumption results therefrom.

DISCLOSURE OF THE INVENTION

Technical Aim

The aim underlying the invention is thereby to propose a clutch for coupling and decoupling an internal combustion engine having a partial drive train which comprises an electric machine, the energy requirement of said clutch being reduced. In addition, the inventive aim is to propose a correspondingly optimized hybrid drive, particularly for a motor vehicle.

SUMMARY

This aim is met in regard to the clutch and in regard to the hybrid drive.

The idea underlying the invention is to associate a mechanical locking means with an adjustable element of the adjustment means of the clutch for the purpose of opening the coupling means. In so doing, the mechanical locking means interacts at the hold-open point of said adjustment means with the adjustable element thereof in a blocking manner. In contrast to an alternative solution, wherein a spindle of self-locking construction is associated with the adjustable element, all demands on the dynamics, power consumption and the holding energy, in particular the holding current of the clutch, which is preferably designed as a starter clutch for starting the internal combustion engine, can be met by providing locking means having an adjustable locking element. The energy conservation of a clutch designed according to the concept of the invention is due to the fact that at least a portion of the forces required for holding open the coupling means are provided by the adjustable locking element of the adjustment means such that the energy requirement of said adjustment means for holding said coupling means open is at least reduced.

There are two possible alternatives with regard to the interaction of the locking means with the at least one adjustable element of the adjustment means, respectively with regard to the configuration of the locking means and/or the adjustable element. In a first possible embodiment, the adjustable locking element interacts with the at least one adjustable element of the adjustment means in such a way that said adjustment means for holding the clutching means open do not have to expend any energy counter to a closing force generated by closing means, in particular at least one spring, preferably at least one disc spring. In other words, the complete hold-open force is provided by the locking means in this first implementation option. The adjustable element of said adjustment means is therefore completely fixed in an open position of the clutching means by the at least one locking element. In the event that an electrical drive is provided for adjusting said adjustable element of said adjustment means, the system in the previously described first embodiment can completely manage without a holding current, whereby the $CO_2$ emissions can be considerably reduced.

According to a second possible embodiment, the locking means are configured such that the blocking (inhibiting) force generated by them on the adjustable element is smaller (preferably slightly smaller) than the force acting on said adjustable element in the closing direction such that the coupling means can be held open with a very slight use of energy (preferably with a small holding current). The energy requirement of the clutch is also minimized in this embodiment when compared to clutches according to the technical field. In the event that the adjustment means malfunction, particularly an electrical drive of said adjustment means, the coupling means in the second embodiment would automatically close without further measures so that a possible demand for "normally closed" is implemented in a simple manner. The closing means, particularly a spring, preferably at least one disc spring, would automatically close the coupling means in the event of a malfunction of the drive of the adjustment means of the embodiment described secondly.

Provision is made in a modification to the embodiment for the locking element of the locking means to be adjustable between a positive-locking position, in which the locking means interact in a positive-locking manner with the adjustable element of the adjustment means, and a release position. A friction fit can be additionally or alternatively implemented with the aid of at least one lockable element.

In order that no electrical or hydraulic energy is required to adjust the locking element into its positive-locking position (alternatively frictionally engaged position), provision is made according to a preferred embodiment for the locking means to comprise at least one spring element and for the locking element to be subjected to a resilient force in the direction of the adjustable element of the adjustment means, preferably in the radial direction in relation to an adjustment direction of said adjustable element. This embodiment is therefore particularly advantageous in that the locking element does not have to be separately actuated. In contrast said locking element automatically interacts in a positive-locking (as an alternative frictionally engaging) manner with the adjustable element of the adjustment means as soon as said adjustable element is situated in its opening position. In so doing, said adjustable element is inhibited, respectively blocked.

In order to ensure a definite holding of the adjustable element in the opening position of the coupling means, respectively the opening position of the adjustable element, by means of the at least one locking means, provision is advantageously made in a modification to the invention for the locking element to be accommodated in its positive-locking position in a recess of said adjustable element. Said locking element is preferably designed bolt-shaped for this purpose. In addition or as an alternative to the sectional accommodation of the locking element in a recess of the adjustable element, it is possible for said locking element to engage on the end side of said adjustable element when said adjustable element is open and thereby to block said adjustable element in this manner.

In order to make a relative rotation of the adjustable element to the locking element possible without compromising the blocking function, an embodiment is preferred, wherein the recess is configured as a groove, preferably as a circumferential groove extending completely around said adjustable element, so that the locking element can block said adjustable element in its opening position in each relative rotational position of said adjustable element relative to the at least one locking element.

The inhibiting, respectively blocking force which counters a closing of the adjustable element of the adjustment means can be adjusted via the depth and form of the recess, with which the at least one locking element interacts and/or via the selection of the spring force acting on the locking element and/or via the form of the section, particularly the tip, of the at least one locking element that interacts with said adjustable element of said adjustment means. As a result of the selection of the aforementioned parameters, the ensuing inhibiting, respectively blocking or locking, force acting on the adjustable element of the adjustment means can be adjusted. Whenever the blocking, respectively inhibiting force is greater than the closing force acting on said adjustable element, no energy is required from the adjustment means for holding the coupling means open, whereas a, preferably only small, energy expenditure has to be provided if the blocking, respectively inhibiting force, is (somewhat) smaller than the closing force, which acts on said adjustable element of the adjustment means and is induced by the closing means.

In order to be able to dynamically adjust the course of the torque adjustment travel when adjusting the adjustable element and thereby when adjusting the coupling means, an embodiment is preferred, wherein the adjustment means comprise a spindle drive which can be actuated by means of an electric motor. Said adjustable element can be adjusted with the aid of the spindle drive such that an opening of the coupling means results therefrom. In so doing, said adjustable element is preferably a component of the spindle drive. Said adjustable element preferably relates to a spindle nut, which is located on the spindle and can be moved by rotation of said spindle.

In order to be able to implement large displacement forces using a small dimensioned drive, an embodiment is advantageous, wherein the adjustable element of the adjustment means comprises at least one master piston, respectively is configured as at least one master piston, with which a hydraulic pressure for opening the coupling means can be built up. As an alternative, the locking element acts on a slave piston of the adjustment means.

An embodiment is particularly advantageous, wherein an hydraulic valve, particularly configured as a check valve, is provided which may be opened by a control unit, particularly in the event of the adjustment means malfunctioning. A drop in pressure in the hydraulic system results from opening the valve so that the force provided by the closing means is sufficient to close the coupling means. Provision of a valve of this type is then particularly advisable if the opening force applied by the locking means exceeds the closing force applied by the closing means.

A clutch for a hybrid drive is particularly preferred whereby the coupling means are configured as a dry-friction clutch. The dry-friction clutch comprises, for example, at least two friction disks (in particular friction rings) which can be moved away from each other to open the clutch by displacing the hydraulic slave piston.

In addition, the invention leads to a hybrid drive, particularly for a motor vehicle, having an internal combustion engine, which, respectively the output side thereof, can be coupled with and decoupled from a drive train which comprises an electric machine by means of a clutch configured as previously described. Said clutch preferably relates to a starter clutch for restarting the internal combustion engine.

BRIEF DESCRIPTION OF THE DRAWINGS

Additional advantages, features and details of the invention ensue from the following description of preferred exemplary embodiments as well as from the drawings. These show in FIG. 1: a schematic depiction of a hybrid drive.

DETAILED DESCRIPTION

Figure 1:
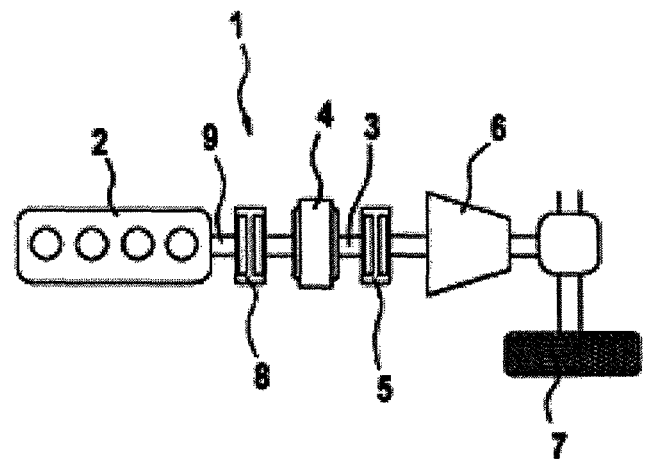

The same components and components with the same function are denoted in the figures with the same reference numerals.

A hybrid drive (parallel hybrid) of a motor vehicle is shown in a schematic depiction in FIG. 1. The hybrid drive 1 comprises an internal combustion engine 2 as well as a partial drive train 3 which comprises an electric machine 4 that operates as an electric motor or a generator depending upon the operating situation. The partial drive train 3 (part of the drive train) comprises one or a plurality of shafts. A starter clutch 5 (e.g. converter/friction clutch) as well as a transmission 6 is disposed in the partial drive train 3. The wheels 7 of a motor vehicle can be set in rotation with the aid of the hybrid drive 1.

The internal combustion engine 2, more precisely a crankshaft 9 (another partial drive train) of said internal combustion engine 2, can be coupled with and or decoupled from the partial drive train 3 which comprises the electric machine 4 by means of the clutch 8 which is configured as a starter clutch. In the event of a malfunction, the clutch 8 is closed, i.e. configured as a so-called normally closed clutch, so that it continues to be possible to conventionally drive with the aid of said internal combustion engine 2 in the case of a defective clutch 8 and/or electric machine 4.

Figure 2:
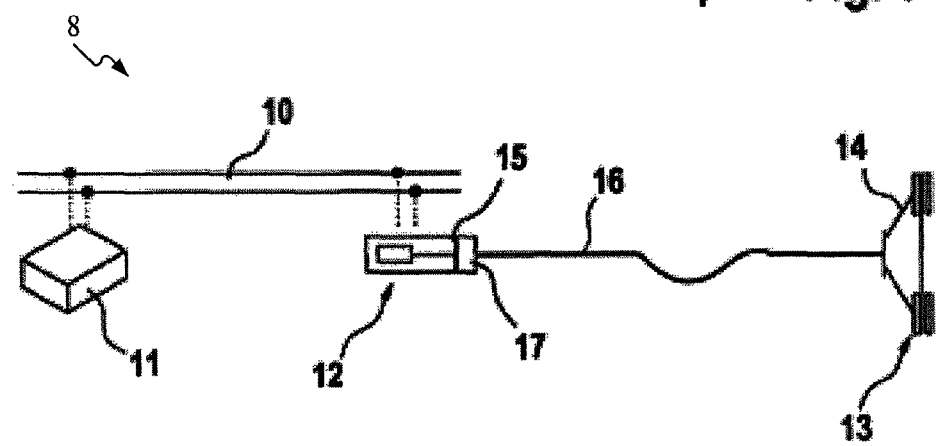
FIG. 2: a starter clutch connected to a data bus

The connection of the very schematically depicted clutch 8 to the control system of a motor vehicle is shown in FIG. 2. It can therein be seen that the clutch 8 is connected to a data bus 10, in this case a CAN-Bus, of the motor vehicle and is connected to a control unit 11 via said data bus 10. The adjustment means 12 of the clutch 8 can be influenced via the control unit 11. With the aid of said adjustment means 12, coupling means 13 configured as a dry-friction clutch can be opened counter to a closing force whereby the internal combustion engine 2 shown in FIG. 1 is decoupled from the partial drive train 3. In the exemplary embodiment shown, the closing force acting on the coupling means 13 is generated by the closing means 14 which are configured as a disc spring and counter an opening of the coupling means 13. For the purpose of displacing said coupling means 13, i.e. opening said coupling means 13, said adjustment means 12 comprise an adjustable element 15, which is configured as a master piston and is coupled with an unspecified slave cylinder of said coupling means 13 such that an opening of said coupling means 13 results through a pressurization of an hydraulic oil 17 by means of the adjustable element 15.

Figure 3:
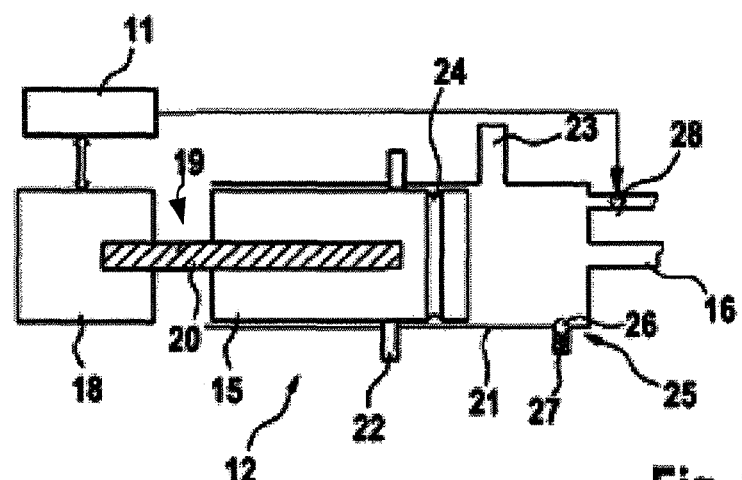
FIG. 3: a schematic configuration of adjustment means (clutch actuator) for a starter clutch.

Parts of the adjustment means 12 are shown in a schematic depiction in FIG. 3. The coupling means 13, which are configured in a manner known per se and schematically depicted in FIG. 2, and the hydraulic line 16 are not shown.

It can be seen in FIG. 3 that the adjustment means 12 for opening the coupling means 13 comprise an electric motor 18, which is configured as a brushless direct current motor, for operating a spindle drive 19. A spindle 20 which is configured as a threaded spindle can be set into rotation with the aid of the electric motor 18. The adjustable element 15, which is configured as a master piston and simultaneously serves as a spindle nut, is thereby engaged via an internal thread with the spindle 20 and is rotatably movable in the axial direction.

In this exemplary embodiment, an annular seal 22 resting against the outer circumference of the cylindrical adjustable element 15 is provided for sealing up the cylinder 21. The electric motor 18 is activated via the control unit 11 so that a controlled adjusting movement of said adjustable element 15 is possible with the aid of the electric motor 18, in particular for the smooth starting of the internal combustion engine 2. By turning the spindle 20, said adjustable element 15 which is configured as a master piston is displaced into the cylinder 21, whereby pressure builds up within said cylinder 21 and this pressure is transferred via the hydraulic line 16 to the coupling means 13, more precisely to a slave cylinder of the adjustment means 12 disposed at said coupling means 13, said slave cylinder opening the coupling means 13 when pressurized.

In order to compensate for changes in volume in the hydraulic oil 17 (operating medium), e.g. by changing the temperature of said hydraulic oil 17, the cylinder 21 is equipped with a port 23 (expansion port) that leads to an unspecified compensating reservoir. The port 23 is released at regular intervals during operation.

The adjustable element 15 which is configured as a master piston includes a recess 24, which is configured as a circumferentially closed groove and to interact with locking means 25, in a forward region facing away from the electric motor 18. In the exemplary embodiment shown, the locking means 25 comprise a locking element 26, which can be adjusted at right angles to the adjustment direction of said adjustable element 15 and is configured in the form of a ball. Said locking element 26 is impinged upon in the radial direction by the resilient force of a spring 27 inwardly into the cylinder 21.

The adjustment means 12 are configured in such a way that the coupling means 13 (cf. FIG. 2) are completely opened if the adjustable element 15 which is configured as a master cylinder is displaced almost completely into the cylinder 21, i.e. to the right as viewed in the drawing plane. In this opening position of said coupling means 13, the locking element 26 is accommodated in a positive-locking manner in the recess of said adjustable element 15 and inhibits or blocks, depending upon the embodiment, a displacing movement of said adjustable element 15 to the left as viewed in the drawing plane. A drop in pressure in the cylinder 21 and consequently a closing movement of said coupling means 13 would result from such a displacing movement. The inhibiting, respectively blocking, force acting on the adjustable element 15 can be adjusted via the depth and the form of the recess 24 that is configured as an annular groove, the resilient force of the spring 27 and the form of the tip of the locking element 26 which interacts with said recess 24. The force acting on said adjustable element 15 as a result of the resilient force of the closing means 14 is calculated via the hydraulic translation of the resilient force, which the closing means 14, which are configured as disc springs, produce in the coupling means 13 when said coupling means 13 are in their open position.

As can further be seen in FIG. 3, a controllable hydraulic valve 28, which can be actuated via the control unit 11, is associated with the hydraulic system, more precisely with the cylinder 21. If, for example, said control unit 11 detects a defect in the electric motor 18, said control unit 11 then causes the valve 28 to open, whereby hydraulic oil 17 can flow out of the cylinder 21. As a result, the pressure drops in the hydraulic system, more precisely in said cylinder 21, of the hydraulic line 16 and in the unspecified slave cylinder. As a consequence of this, the closing force of the closing means 14 exceeds the hydraulic pressure forces and the coupling means 13 are therefore closed. In the event of a leak in the line, the demand for "normally closed" is likewise met because the closing means 14 then pushes the hydraulic oil 17 out of said hydraulic cylinder 21 and said coupling means 13 closes as a result.

Depending upon a configuration of the locking means 25, more precisely the recess 24, the locking element 26 and/or the spring 27, the inhibiting, respectively blocking, force 20 acting on the adjustable element 15 can be adjusted such that said force is greater than the force acting on the adjustable element 15 which is caused by the closing means 14. In this case, the electric motor 18 can be switched off when the coupling means 13 are open so that no holding current is consumed. As an alternative, it is possible for the inhibiting force acting on the adjustable element 15 to be adjusted in such a way that it is somewhat 25 less than the force acting on said adjustable element 15 which is caused by said closing means 14; thus enabling the electric motor 18 to hold the coupling means 13 open with but a small holding current.

The invention claimed is:

1. A clutch for coupling an internal combustion engine in a torque transmitting fashion and decoupling the internal combustion engine, said internal combustion engine having a partial drive train which comprises an electric machine, wherein the clutch comprises:
   a closing unit configured to generate a closing force;
   an adjustment unit comprising at least one adjustable element configured to be opened counter to the closing force;
   an electrical drive configured to adjust the at least one adjustable element; and
   a locking unit that interacts with the adjustable element and has an adjustable locking element, said locking unit configured to interact with the adjustable element to:
   hold open a coupling unit without an opening force having to be applied to hold open the coupling unit by the adjustment unit, wherein holding open the coupling unit without an opening force is done without a holding current being drawn by the electrical drive; and reduce the opening force which has to be applied by the adjustment unit to hold the coupling unit open, wherein a hydraulic valve is opened by a control unit when the adjustment unit malfunctions so that the closing unit can close the coupling unit.

2. The clutch according to claim 1, wherein the adjustable locking element is displaced between a positive-locking position, in which the adjustable locking element interacts with the adjustable element in a positive-locking manner, and a release position.

3. The clutch according to claim 2, wherein the adjustable locking element is subjected to a resilient force in the direction of the adjustable element.

4. The clutch according to claim 1, wherein the adjustable locking element comprises a ball-shaped locking element that is displaced into a recess of the adjustable element.

5. The clutch according to claim 4, wherein the recess comprises a circumferential groove extending around the adjustable element.

6. The clutch according to claim 4, wherein a contact surface is provided between the adjustable locking element and the recess, said contact surface being slanted or curved such that a force acting on the adjustable locking element at an angle to the adjustment direction of the adjustable element results from the closing force of the closing unit.

7. The clutch according to claim 1, wherein the adjustable element is configured to be adjusted by a spindle drive actuated by an electric motor.

8. The clutch according to claim 1, wherein the adjustable element is a hydraulic master piston or a hydraulic slave piston.

9. The clutch according to claim 1, wherein the hydraulic valve is a check valve.

10. The clutch according to claim 1, wherein the coupling unit is a dry-friction clutch.

11. The clutch of claim 1, wherein the clutch is a component of a hybrid drive.

* * * * *